United States Patent
Krishnaswamy et al.

(10) Patent No.: US 9,220,069 B2
(45) Date of Patent: Dec. 22, 2015

(54) METHOD AND APPARATUS FOR DELAY-CONSTRAINED END-TO-END ENERGY OPTIMIZATION FOR WIRELESS SERVICES

(75) Inventors: Dilip Krishnaswamy, San Diego (KR); Hoang V. Nguyen, Champaign, IL (US)

(73) Assignee: QUALCOMM Incorporated, San Diego, CA (US)

( * ) Notice: Subject to any disclaimer, the term of this patent is extended or adjusted under 35 U.S.C. 154(b) by 477 days.

(21) Appl. No.: 12/683,522

(22) Filed: Jan. 7, 2010

(65) Prior Publication Data

US 2011/0164539 A1 Jul. 7, 2011

(51) Int. Cl.
*H04W 52/02* (2009.01)

(52) U.S. Cl.
CPC ...... *H04W 52/0261* (2013.01); *H04W 52/0251* (2013.01)

(58) Field of Classification Search
CPC .............. H04W 52/0261; H04W 52/0251
USPC .............. 370/311, 318; 455/406, 447, 574; 342/357.74
See application file for complete search history.

(56) References Cited

U.S. PATENT DOCUMENTS

| | | | |
|---|---|---|---|
| 6,201,966 B1 * | 3/2001 | Rinne et al. | 455/434 |
| 6,480,476 B1 | 11/2002 | Willars | |
| 6,671,525 B2 * | 12/2003 | Allen et al. | 455/574 |
| 6,973,336 B2 * | 12/2005 | Heie | 455/574 |
| 7,457,973 B2 | 11/2008 | Liu | |
| 7,840,828 B2 * | 11/2010 | Fallon et al. | 713/324 |
| 7,983,685 B2 * | 7/2011 | Silverstrim et al. | 455/447 |
| 8,072,379 B2 * | 12/2011 | Gopinath | 342/357.74 |
| 2004/0000713 A1 | 1/2004 | Yamashita et al. | |
| 2004/0063454 A1 | 4/2004 | Sasaki | |
| 2005/0144318 A1 | 6/2005 | Chang | |
| 2005/0163088 A1 | 7/2005 | Yamano et al. | |
| 2006/0229520 A1 | 10/2006 | Yamashita et al. | |
| 2007/0097895 A1 | 5/2007 | Keshavarzian et al. | |
| 2007/0259673 A1 | 11/2007 | Willars et al. | |
| 2008/0290822 A1 * | 11/2008 | Greene et al. | 315/363 |
| 2009/0124233 A1 * | 5/2009 | Morris | 455/406 |

(Continued)

FOREIGN PATENT DOCUMENTS

| | | |
|---|---|---|
| CN | 1801669 A | 7/2006 |
| EP | 1672468 A2 | 6/2006 |

(Continued)

OTHER PUBLICATIONS

Cohen et al ("An Optimal Wake-Up Scheduling Algorithm for Minimizing Energy Consumption While Limiting Maximum Delay in a Mesh Sensor Network" paper published on IEEE/ACM Transaction on Networking, vol. 17, No. 2, Apr. 2009, pp. 570-581).*

(Continued)

*Primary Examiner* — Jung Park
*Assistant Examiner* — Chuong M Nguyen
(74) *Attorney, Agent, or Firm* — James Gutierrez (57) ABSTRACT

An apparatus including a processing system configured to determine an energy consumption on the mobile device during sleep and active modes of the mobile device; determine an energy consumption on the sensor during sleep and active modes of the sensor; determine energy levels of the mobile device and the sensor, and; set sleep durations of the mobile device based on the sleep duration of the sensor while meeting an end-to-end delay constraint for a service related to the sensor. A method is also disclosed.

28 Claims, 7 Drawing Sheets

(56) References Cited

U.S. PATENT DOCUMENTS

| | | |
|---|---|---|
| 2010/0105449 A1 | 4/2010 | Shi et al. |
| 2010/0128645 A1 | 5/2010 | Lin et al. |
| 2011/0211513 A1* | 9/2011 | Eregen et al. ............ 370/311 |

FOREIGN PATENT DOCUMENTS

| | | |
|---|---|---|
| EP | 1679914 A1 | 7/2006 |
| GB | 2328588 A | 2/1999 |
| JP | 2004024551 A | 1/2004 |
| JP | 2004128798 A | 4/2004 |
| JP | 2005217548 A | 8/2005 |
| JP | 2006312010 A | 11/2006 |
| JP | 2008170169 A | 7/2008 |
| JP | 2010539829 A | 12/2010 |
| WO | WO-2009036786 A1 | 3/2009 |

OTHER PUBLICATIONS

Cohen et al ("An Optimal Wake-Up Scheduling Algorithm for Minimizing Energy Consumption While Limiting Maximum Delay in a Mesh Sensor Network" paper published on IEEE/ACM Transaction on Networking, vol. 17, No. 2, Apr. 2009, pp. 570-581.*

Yuan et al, "Energy and latency control in low duty cycle MAC protocols" paper published 2005 IEEE Wireless Communication and Networking Conference published Mar. 17, 2005.*

Cohen, "An Optimal Wake-Up Scheduling Algorithm for Minimizing Energy Consumption While Limiting Maximum Delay in a Mesh Sensor Network", paper published on IEEE/ACM Transaction on Networking, vol. 17, No. 2, Apr. 2009, pp. 570-581.*

Yuan, "Energy and latency control in low duty cycle MAC protocols", paper published 2005 IEEE Wireless Communication and Networking Conference, Mar. 17, 2005.*

LAN/MAN Standards Committee of the IEEE Computer Society "Part 15.4b: Wireless Medium Access Control (MAC) and Physical Layer (PHY) Specifications for Low Rate Wireless Personal Area Networks WPANs", Standard document 802.15.4b Oct. 2005.*

Reuven Cohen, et al. "An Optimal Wake-Up Scheduling Algorithm for Minimizing Energy Consumption While Limiting Maximum Delay in a Mesh Sensor Network", Apr. 2009, IEEE/ACM Transactions on Networking, vol. 17, pp. 570-581.*

LAN/MAN Standards Committee of the IEEE Computer Society (Part 15.4b: Wireless Medium Access Control (MAC) and Physical Layer (PHY) Specifications for Low Rate Wireless Personal Area Networks WPANs) published in Oct. 2005.*

Cohen, R. et al., "An Optimal Wake-Up Scheduling Algorithm for Minimizing Energy Consumption While Limiting Maximum Delay in a Mesh Sensor Network", Networking, IEEE/ACM Transactions on, Apr. 2009, pp. 570-581, vol. 17, Issue 2.

International Search Report and Written Opinion—PCT/US2011/020555—ISA/EPO—Apr. 27, 2011.

Sarkar, M.et al., "An adaptive "sleep" algorithm for efficient power management in WLANs", VTC2005-Spring: 2005 IEEE 61ST Vehicular Technology Conference, 2005, pp. 2101-2104, vol. 3.

Taiwan Search Report—TW100100710—TIPO—May 28, 2013.

* cited by examiner

METHOD AND APPARATUS FOR DELAY-CONSTRAINED END-TO-END ENERGY OPTIMIZATION FOR WIRELESS SERVICES

BACKGROUND

I. Field

The following description relates generally to communication systems, and more particularly to a method and apparatus for delay-constrained end-to-end energy optimization for wireless services.

II. Background

Data services such as the 3G data service have been successful on cell phones and laptops. Many users have more personal devices than just cell phones and laptops. However, these devices are not well-connected. Reasons for this include:

Limited wireless connectivity of these personal devices; and

A lack of possible services over a network of personal devices.

With wireless wide area network (WWAN) being available over 3G networks, these personal devices can be connected to the WAN with a personal private network (PPN). A PPN can potentially enable many ubiquitous applications, such as remote monitoring. For example, parents can determine the health condition of their kids using cell phones if their kids wear WWAN-enabled sensors. Home and car owners can be notified based on such events as unauthorized intrusions if cars and homes are equipped with WWAN-enabled alarm sensors. These examples are just a few among the many possible applications that may be implemented over PPNS. However, there are timing and energy constraints that need to be met for the system to be useful.

Consequently, it would be desirable to address one or more of the deficiencies described above.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to various aspects, the subject innovation relates to systems and/or methods that provide wireless communications, where an apparatus for operating a mobile device and a sensor within local wireless proximity of the mobile device includes a memory configured to store a plurality of instructions; and a processing system configured to execute the plurality of instructions to determine an energy consumption on the mobile device during sleep and active modes of the mobile device; determine an energy consumption on the sensor during sleep and active modes of the sensor; determine energy levels of the mobile device and the sensor, and; set sleep durations of the mobile device based on the sleep duration of the sensor while meeting an end-to-end delay constraint for a service related to the sensor.

In another aspect, an apparatus for operating a mobile device and a sensor within local wireless proximity of the mobile device is provided that includes means for determining an energy consumption on the mobile device during sleep and active modes of the mobile device; means for determining an energy consumption on the sensor during sleep and active modes of the sensor; means for determining energy levels of the mobile device and the sensor, and; means for setting sleep durations of the mobile device based on the sleep duration of the sensor while meeting an end-to-end delay constraint for a service related to the sensor.

In yet another aspect, a method for operating a mobile device and a sensor within local wireless proximity of the mobile device is provided that includes determining an energy consumption on the mobile device during sleep and active modes of the mobile device; determining an energy consumption on the sensor during sleep and active modes of the sensor; determining energy levels of the mobile device and the sensor; and setting sleep durations of the mobile device based on the sleep duration of the sensor while meeting an end-to-end delay constraint for a service related to the sensor.

In yet another aspect, a computer-program product for operating a mobile device and a sensor within local wireless proximity of the mobile device is provided that includes a machine-readable medium encoded with instructions executable to determine an energy consumption on the mobile device during sleep and active modes of the mobile device; determine an energy consumption on the sensor during sleep and active modes of the sensor; determine energy levels of the mobile device and the sensor, and; set sleep durations of the mobile device based on the sleep duration of the sensor while meeting an end-to-end delay constraint for a service related to the sensor.

In yet another aspect, an apparatus for operating a mobile device and a sensor within local wireless proximity of the mobile device, comprising a processing system configured to determine an energy consumption on the mobile device during sleep and active modes of the mobile device; determine an energy consumption on the sensor during sleep and active modes of the sensor; determine energy levels of the mobile device and the sensor, and; set sleep durations of the mobile device based on the sleep duration of the sensor while meeting an end-to-end delay constraint for a service related to the sensor.

To the accomplishment of the foregoing and related ends, the one or more aspects comprise the features hereinafter fully described and particularly pointed out in the claims. The following description and the annexed drawings set forth in detail certain illustrative aspects of the one or more aspects. These aspects are indicative, however, of but a few of the various ways in which the principles of various aspects may be employed and the described aspects are intended to include all such aspects and their equivalents.

DETAILED DESCRIPTION

Various aspects of the novel systems, apparatus and methods are described more fully hereinafter with reference to the accompanying drawings. The teachings disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that that the scope of disclosure is intended to cover any aspect of the novel systems, apparatus and methods disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

In the detailed description that follows, various aspects of the disclosure will be described with reference to a wireless communication system supporting any suitable wireless technology, such as Code Division Multiple Access (CDMA), Time Division Multiple Access (TDMA), or any other suitable wireless technology, or any combination of suitable wireless technologies. A CDMA system may implement IS-2000, IS-95, IS-856, Wideband-CDMA (WCDMA), or some other suitable air interface standard. A TDMA system may implement Global System for Mobile Communications (GSM) or some other suitable air interface standard. As those skilled in the art will readily appreciate, the various aspects of this disclosure are not limited to any particular wireless technology and/or air interface standard.

Disclosed herein are network and software architectures and an underlying infrastructure that enables a WWAN-enabled PPNS network. Several alternatives of system architecture are also disclosed. A distributed/shared wireless services architecture is implemented in one aspect of the disclosure, with different wireless nodes having the ability to publish services and subscribe to wireless services through a common server. A subscribing first wireless node with WWAN connectivity can submit a polling request to the common server for information that can be delivered by a second wireless node with WWAN connectivity providing the service. There can be a delay constraint associated with a wireless service, so that the information is delivered within a time constraint specified by the delay. The second wireless node providing the service may have to consume more energy to provide the service for a shorter delay. For example, the second wireless node may have to talk to a third wireless node (such as a wireless sensor node) over a short range wireless link, and for a shorter delay constraint, the second wireless node may have to sleep for a shorter duration, which would increase energy costs. The disclosed approach minimizes end-to-end energy utilization in such a distributed system under such a wireless service delay constraint.

Generally, energy costs for sleep and awake cycles are computed on each of the wireless nodes in the end-to-end system architecture. Given the total time constraint in terms of the delay, the duration of a sleep cycle is varied on each of the wireless platforms, so that overall system energy over all wireless platforms involved in delivering the service is optimized. For example, if one of the wireless nodes (such as the second wireless node in the problem description) sleeps for a significant fraction of the available time delay constraint, then that may leave much less time for information exchange with the wireless sensor node. This implies that the third wireless sensor node needs to wakeup more often to talk to the second wireless node, consuming more energy. At the same time, if the second wireless node sleeps longer, then its battery will last longer to provide the service. Different values of sleep durations are considered for wireless nodes, and the optimal values are determined that minimize end-to-end system energy, such that incorporating the sleep times, awake times, processing times, and network communication times, the overall delay is within an end-to-end time delay constraint for the service. This allows the service to be delivered within a desirable delay constraint while minimizing energy on the wireless platforms involved in providing the service. For example, it is shown that given a tolerable delay (such as 8 seconds), the platform energy consumption is minimal (such as 0.8% of standby time) to provide the service on the second wireless node. However reducing the tolerable delay can significantly consume the standby time for processing, so that an optimal acceptable sleep time can be determined to provide the wireless service while consuming a negligible amount of system energy.

Most platform energy optimization is performed locally on a platform. This approach considers a distributed energy optimization scheme that deals with end-to-end delay constraints associated with providing one or more services over a wireless network. The approach attempts to minimize the consumed energies associated with the wireless devices involved in providing the services.

In addition, high data rate services can consume higher amounts of energy for wireless transmissions and for local processing. Such constraints would increase energy costs that would affect the optimal solution for determining sleep times for the wireless service on the wireless devices being considered. The disclosed approach helps determine the amount of energy consumption needed to maintain a critical service alive on the platform. For example, to provide a critical service such as a wireless health sensor monitoring service. This can be used to shut down non-critical services in favor of a critical service. Additionally, the disclosed approach can be used to extend the delay associated with providing a wireless service while reducing energy consumption to extend the availability of the wireless service. Thus, the provision of wireless services can be gracefully backed-off on a mobile device, with more critical services kept active while less critical services are shut off gradually.

Figure 1:
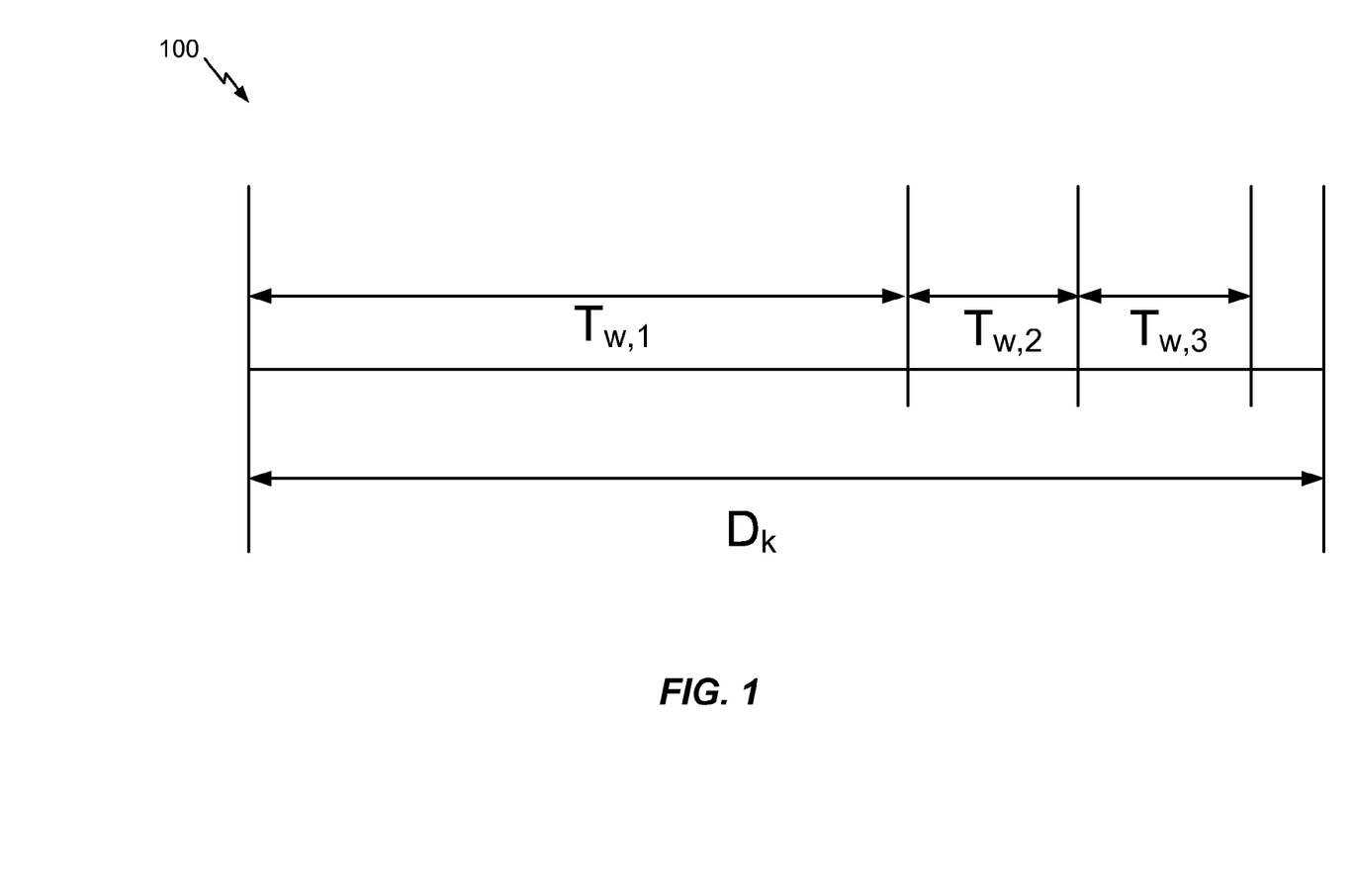
FIG. 1 is a timing diagram illustrating a time delay constraint configured in accordance with one aspect of the disclosure.

Referring to FIG. 1, the timing constraint determination will be described with reference to a timeline 100, where a distributed wireless system with N nodes has to deliver one or more services $S_L$ with information gathered from the distributed wireless system and delivered within a specified delay constraint $D_k$. Each of the N nodes may have a sleep schedule with a sleep period $T_i$, where each node i, which in this case includes nodes 1-3, wakes up for a duration $T_{On,i}$. The N nodes need to co-operate to determine an optimal sleep schedule for each of the nodes, such that all services are delivered satisfactorily. Assume without loss of generality that one of the services uses K nodes in a multi-hop wakeup communication sequence for the service.

If the sleep period for node is $T_i$, with an on time of $T_{On,i}$, then the average time to wakeup, $T_{w,i}$, is given by:

$$\frac{(T_i - T_{On,i})}{2}.$$

The goal is to minimize the average distributed wireless system power given by:

$$\sum_i \frac{\alpha_i}{T_i} (E_i^{SwOn} + E_i^{SwOff} + T_{On,i} * E_i^{On} + (T_i - T_{On,i}) * E_i^{Off}),$$

subject to an average delay constraint:

$$\sum_i t_{w,i} < D_k - \delta,$$

or equivalently subject to the constraint:

$$\sum_i \frac{(T_i - T_{On,i})}{2} < D_k - \delta;$$

where $E_i^{SwOn}$ is the energy consumed when switching to active mode, $E_i^{SwOff}$ is the energy consumed when switching to sleep mode, $E_i^{On}$ is the energy consumed in the active mode, $E_i^{Off}$ is the energy consumed in the sleep mode, and $\delta$ is the time needed for processing information for the service $S_L$.

In one aspect of the disclosure, $\alpha_i$, which is used to determine the weighting of each Node N, is based on at least one of a frequency of rechargeability; a current energy level; maximum capacity of energy storage; and a predetermined priority level. Specifically, $\alpha_i$ is a weighting for a node i that may be based on any one of the aforementioned parameters. The weighting may be a function of the aforementioned parameters. For example, the energy level parameter may be based on a sigmoid function of the current energy level of the mobile device or the sensor.

For example, if a mobile has a current energy level, $W_1$, of 400 mAh of charge, and a sensor only has a current energy level, $W_2$, of 50 mAh, then the relative weighting of energy of the mobile device to the sensor, $W_2$:$W_1$, is 1:8. In another example, if the mobile device has a charging schedule that is 4 times as often as the sensor, then the relative weighting is 1:4. Further, the relative weighting may be a combination of multiple parameters. Continuing with the previous example, the relative weighting may be based on both the current energy level and the charging schedule. Thus, the relative weighting of the combined parameters for the mobile device and the sensor is 1:32.

Alternatively, if a guarantee on the worst case delay constraint is desired, then the distributed system power is optimized relative to the delay constraint:

$$\sum_i (T_i - T_{On,i}) < D_k - \delta.$$

When L services need to be delivered, then the distributed system power needs to be optimized such that delay constraints for all services are satisfied.

To explain an impact on single node system energy, consider a battery powered wireless device such that the sleep current is 2 mA and processing current is about 82 mA to process a service. Assume that on time is about 2 ms. Then average current (not including switching energy cost for state transitions) for a sleep period of T ms for the service is given by:

$$(1/T_i)*(2 \text{ mA}*(T_i-2)\text{ms}+82 \text{ mA}*2 \text{ ms})=(2+160/T_i) \text{ mA}$$

Reduction in standby time is given by the fraction:

$$\left(1 - \frac{2}{2 + \frac{160}{T_i}}\right) = \frac{\frac{160}{T_i}}{2 + \frac{160}{T_i}} = \frac{160}{2T_i + 160}.$$

Consequently, when $T_i$=1000 ms, then standby time reduces by a fraction of 7.4%, and when $T_i$=8000 ms, then standby time reduces by a fraction of 0.9%.

It is apparent that if a given node chooses to sleep longer, there are substantial savings in standby time for the node. In a distributed system, all nodes will compete to have longer standby time, and it is necessary for them to co-operate to optimize the overall energy consumption in the entire system.

Figure 2:
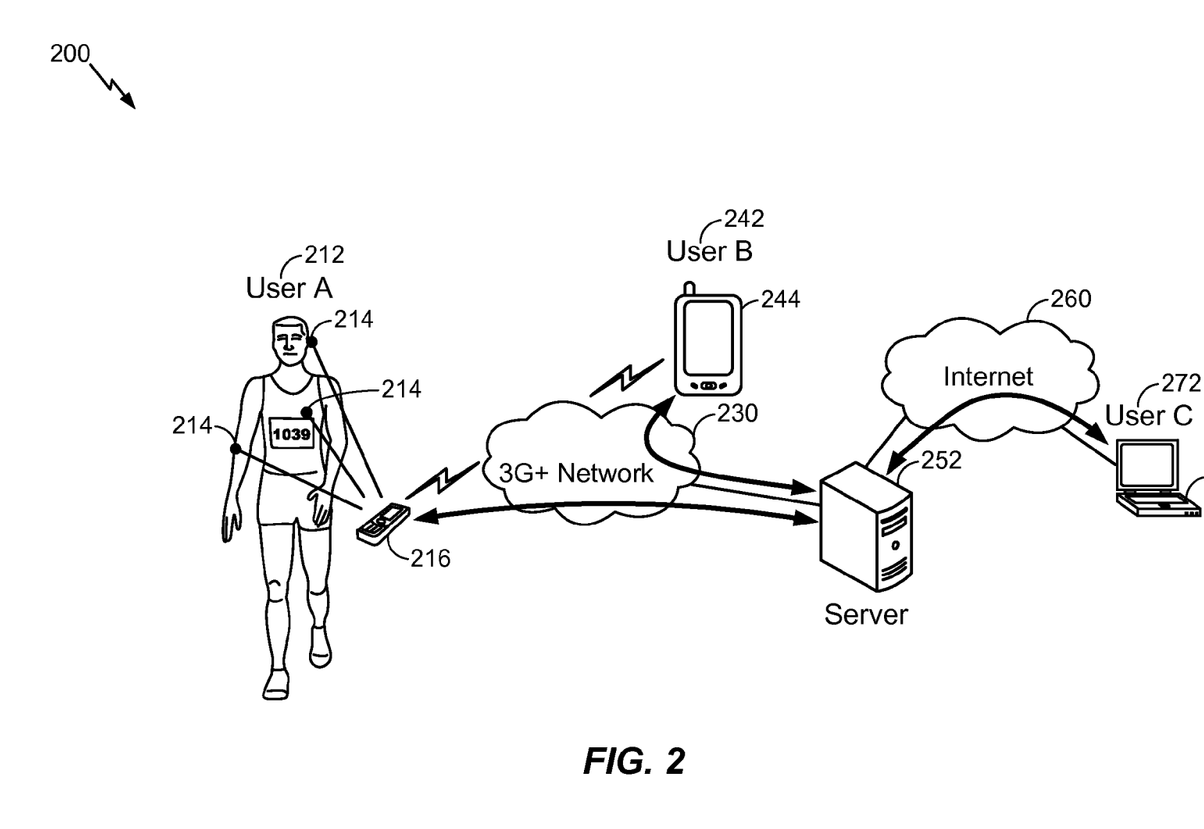
FIG. 2 is a diagram illustrating a remote monitoring system configured in accordance with one aspect of the disclosure.

FIG. 2 illustrates a remote monitoring system 200 configured in accordance with one aspect of the disclosure. A plurality of body sensors 214 are attached to a User A 212. A cell phone 216 of the User A 212 acts as a gateway for all sensors in the plurality of body sensors 214 to connect to a server 252 over a 3G network 230. The server 252 delivers relevant information to a User B 242 who uses a PDA 244 to connect to the server 252 over the 3G network 230. A User C 272, who is a doctor, can use a laptop 274 to monitor a patient such as the User A 212 over an Internet network 260.

Figure 3:
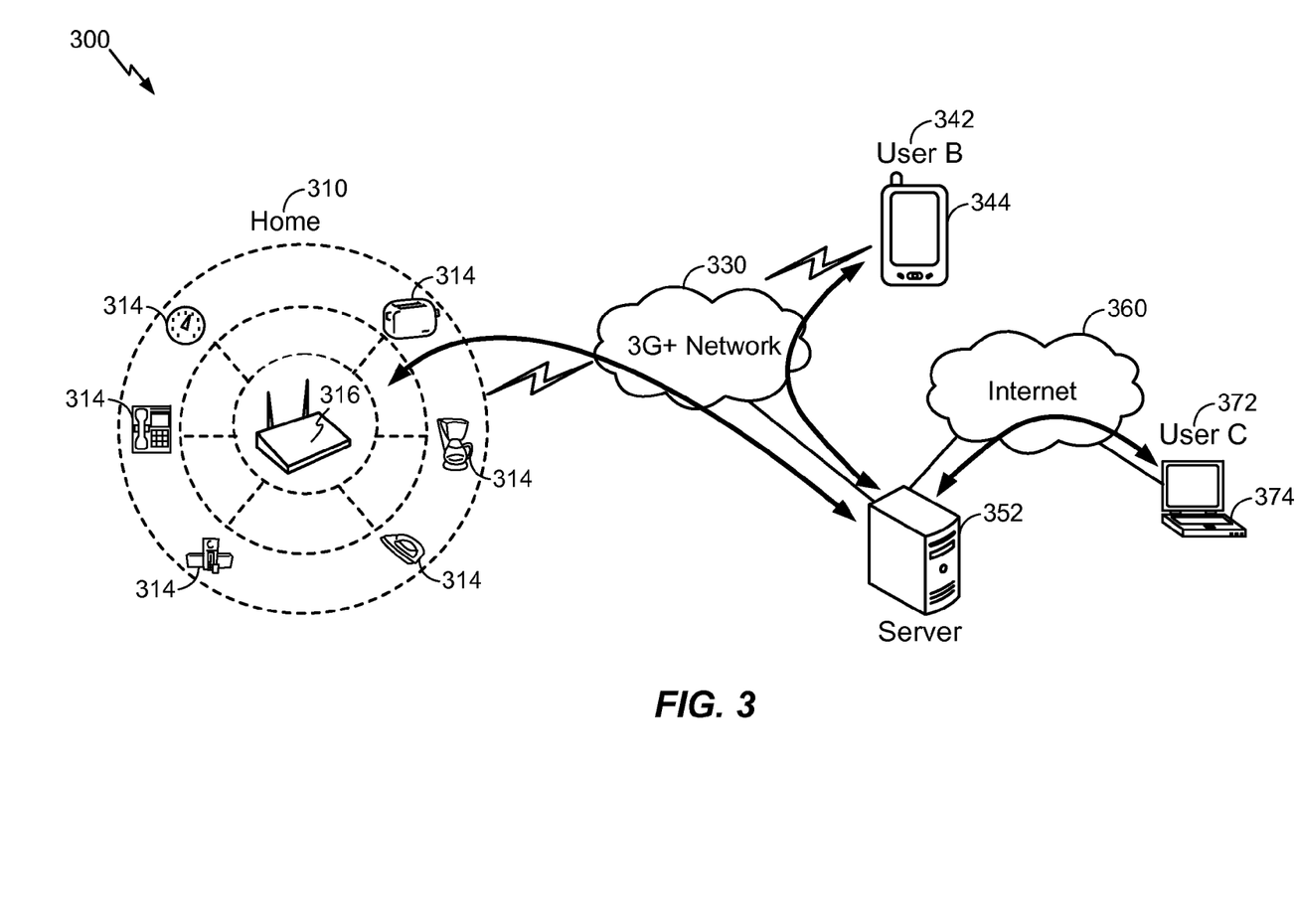
FIG. 3 is a diagram illustrating a home monitoring system configured in accordance with one aspect of the disclosure.

In another aspect of the disclosure, a home monitoring system 300 is illustrated in FIG. 3. A plurality of home sensors 314, each attached to an appliance, reports information to a WWAN-enabled gateway 316 in a home network 310, where the information is processed and sent to a server 352. In one aspect of the disclosure, each one of the plurality of home sensors 312 is WWAN-enabled, and thus can also send information directly to the server instead of, or in addition to going through, the WWAN-enabled gateway 316. Similar to the previous scenario described in FIG. 2, the server 352 can transmit relevant information to users interested in this information, such as a User B 342 and a User C 372. In one aspect of the disclosure, in addition to the ability to monitor appliances, users can also control the appliances. For example, users can monitor and control the energy usage of the appliances. Once users are informed of the current energy consumption of each device, they can decide to turn the devices on/off immediately or to have a plan executed at the WWAN-enabled gateway 316 to schedule the operation of the appliances.

It should be noted in the above scenarios that, first, users using these services may share the data usage plan with their existing cell phone or mobile device. In other words, these accessories, or WWAN-enabled devices, are deployable using a user's existing data plan. Second, all users mentioned in the scenarios are preferably either within a single trusted entity such as a family, or those that are authorized by users to participate in a particular PPNS.

In practice, both push-type and pull-type communication models are used in the various aspects of the disclosure. The push-type communication model is needed when events of interest from one or more sensors need to be delivered in a timely manner. In one aspect of the disclosure, interesting events can be defined by the users. The definition can be created using any expressive query language such as SQL or XML. Consequently, the notion of "interesting" events can be based on the content of the events. The push-type communication model can be based on either a one-to-many or many-to-many model as multiple users may be interested in the events coming from one or more sensors. For example, a home intrusion alert may be delivered to both a home owner and police.

The pull-type communication model is useful when a user, after being notified based on one or more interesting events, wants to query a specific device or set of devices. In one aspect of the disclosure, the query can be a polling query or an aggregation query. For example, after a user is notified that there may be an intrusion to the user's home, the user may want to query sensors for a gate or, if the user has surveillance cameras, several cameras directly. In another example, a user may want to determine power consumption as measured by all appliances in the user's residence. The former example is query to a single sensor while the latter example is an aggregation query addressing a set of devices.

In one aspect of the disclosure, any of the sensors, the gateway or the query clients used by users—collectively referred to as "client devices", may be mobile. Consequently, there may be a great demand for mobility support. When mobile, client devices may become unable to communicate due to the client devices not being within an area of coverage. Thus, the client devices may not be able to maintain synchronous and persistent communication and, consequently, servers have to be able to provide support asynchronous communications and provide persistence of client messages. Handoff is another requirement because client devices may disconnect at one access point and connect to another access point.

Because client devices run on battery, energy efficiency is a significant issue. There are two important requirements for the energy consumption. The first one is to minimize the total power consumption of the client devices. The other one is to ensure the sustainability of any services for a required duty period.

Figure 4:
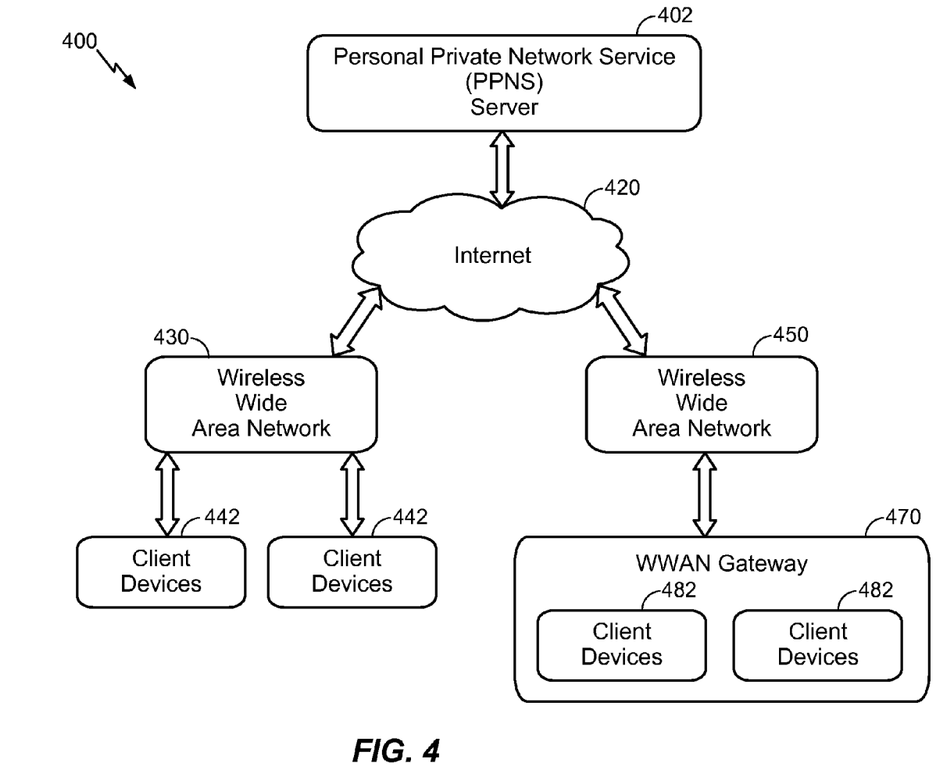
FIG. 4 is a network diagram illustrating a network architecture configured in accordance with one aspect of the disclosure.

A network architecture 400 configured in accordance with one aspect of the disclosure is illustrated in FIG. 4. The network architecture 400 is a combination of flat and hierarchical network architectures. In the flat network architecture, each client device has a WWAN interface to connect directly to the Internet, whereas in the hierarchical architecture, each client device communicates in multi-hop manner to reach a WWAN-enabled gateway acting as a backhaul to the Internet. In the figure, a flat network architecture is implemented by a plurality of client devices 442 being connected to a WWAN 430 directly, which itself is connected to a network 420 such as the Internet, to communicate with a PPNS server 402. Alternatively, client devices may be connected to the WWAN through a WWAN-enabled gateway to implement a hierarchical network architecture. Referring to the figure, a plurality of client devices 482 is connected to a WWAN 450 through a WWAN gateway 470. The personal private network services provided by the PPNS server 402 are accessible from the Internet network 420 or 3G networks WWAN 450. The flat architecture provides more mobility and flexibility as each client device can interface to the network 420 directly. However, each client device must then require more hardware, which increases the cost for hardware on a per-client device basis versus a gateway device to support these non-WWAN-enabled client devices. The flat network architecture would provide more robustness as well as manageability, even as the client devices have to manage their own energy expenditure.

Figure 5:
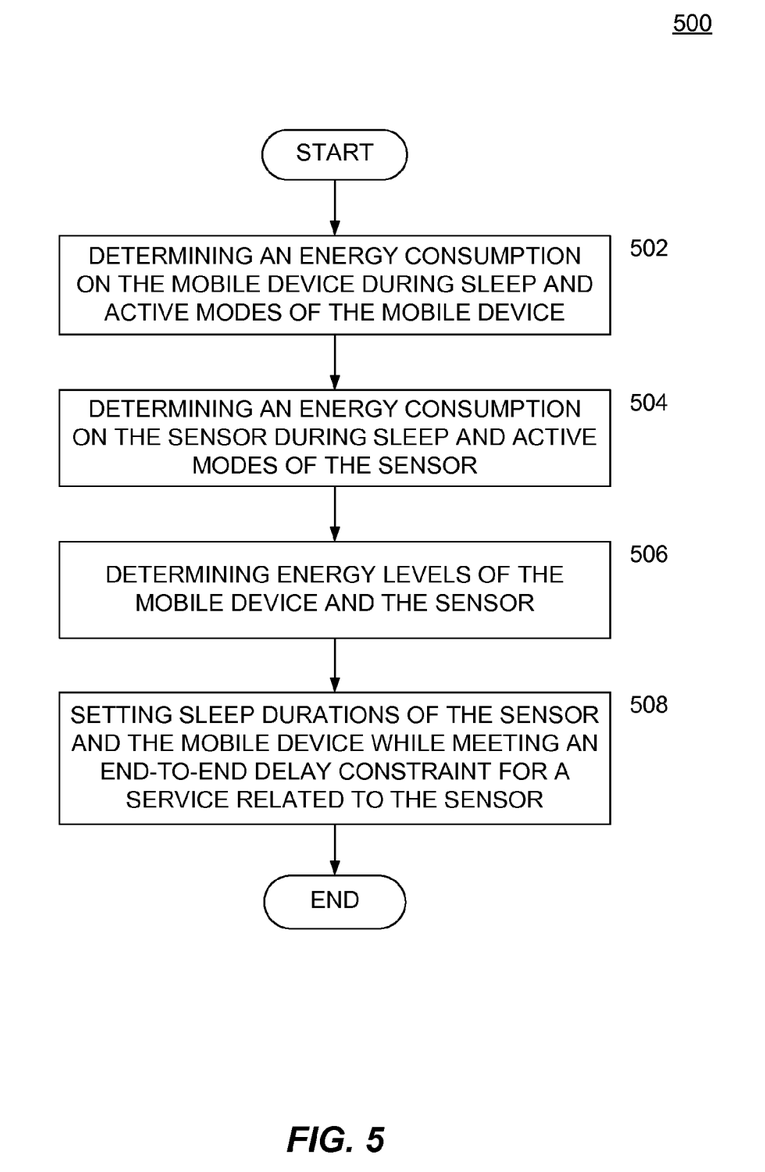
FIG. 5 is a flow diagram illustrating an energy optimization scheme configured in accordance with one aspect of the disclosure.

FIG. 5 a flow diagram 500 illustrating the functionality of an energy optimization scheme for operating a mobile device and a sensor within local wireless proximity of the mobile device in accordance with one aspect of the disclosure. The scheme includes a step 502 for determining an energy consumption on the mobile device during sleep and active modes of the mobile device. For example, an energy expenditure of the mobile device may be determined based on an amount of sleep and wake periods, and the associated energy expenditures for each. The scheme also includes a step 504 for determining an energy consumption on the sensor during sleep and active modes of the sensor. For example, an energy expenditure of the sensor may be determined based on an amount of sleep and wake periods, and the associated energy expenditures for each. Further, the scheme includes a step 506 for determining energy levels of the mobile device and the sensor. In one example, the current battery levels for each of the mobile device and the sensor may be measured and reported. Then, a step 508 for setting sleep durations of the mobile device based on the sleep duration of the sensor while meeting an end-to-end delay constraint for a service related to the sensor. The respective sleep durations may be determined using the formula above. The mobile device and the sensor may be controlled by an energy optimization unit, as further described herein.

Figure 6:
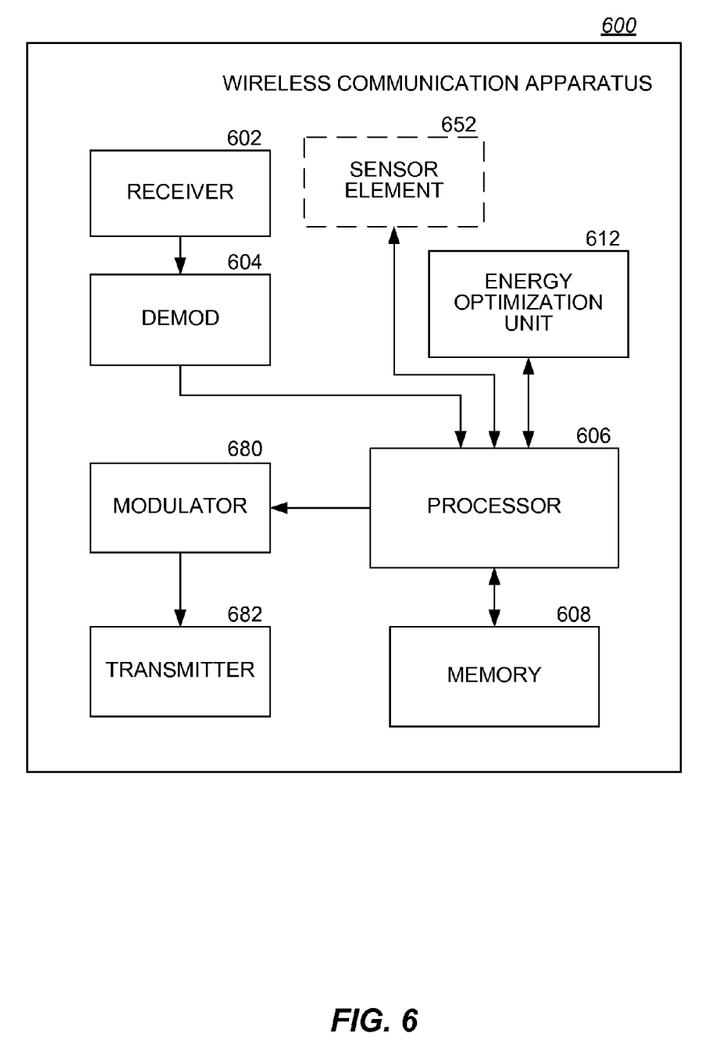
FIG. 6 is a block diagram of a wireless communication apparatus as configured in accordance with one aspect of the disclosure that may be used in the wireless network of FIG. 4.

FIG. 6 is an illustration of a wireless communication apparatus 600 that facilitates receiving and processing messages received over a wireless network such as the wireless network 400 of FIG. 4. The wireless communication apparatus 600 may be used to implement a wireless communication device such as the cell phone 216. The wireless communication apparatus 600 may also be used to implement a sensor such as the body sensors 214 or the home sensors 314, when a sensor element 652 is used. The wireless communication apparatus 600 includes a receiver 602 that receives a signal from, for instance, a receive antenna (not shown), performs typical actions on (e.g., filters, amplifies, downconverts, etc.) the received signal, and digitizes the conditioned signal to obtain samples. Receiver 602 then passes the samples to a demodulator 604 that can demodulate received symbols and provide them to a processor 606 for data processing. The processor 606 can be a processor dedicated to analyzing information received by the receiver 602 and/or generating information for transmission by a transmitter 682, a processor that controls one or more components of the wireless communication apparatus 600, and/or a processor that both analyzes information received by the receiver 602, generates information for transmission by the transmitter 682, and controls one or more components of the wireless communication apparatus 600.

The wireless communication apparatus 600 can further comprise an energy optimization unit 612 coupled to the processor 606 that allows the wireless communication apparatus 600 to operate a delay-constrained end-to-end energy optimization scheme in accordance with one aspect of the disclosure. The wireless communication apparatus 600 still further comprises a modulator 680 and transmitter 682 that respectively modulate and transmit signals to, for instance, another wireless communication device (sensor, access terminals, access points, etc.). This can operate as part of a disparate bidirectional wireless network utilized to communicate information. By way of example and not limitation, the sensor element 652 may be used to sense signals related to a body, if used as a body sensor, or an environmental variable, if used as a home sensor. The sensor element 652 may also be used to implement a user interface, if the sensor is a motion sensor that may be used to sense movement by the user related to a user interface, for example. Although depicted as being separate from the processor 606, it is to be appreciated that the energy optimization unit 612, demodulator 604, and/or modulator 680 can be part of the processor 606 or multiple processors (not shown).

The wireless communication apparatus 600 can additionally comprise a memory 608 that is operatively coupled to the processor 606 and that can store data to be transmitted, received data, information related to available channels, data associated with analyzed signal and/or interference strength, information related to an assigned channel, power, rate, or the like, and any other suitable information for estimating a channel and communicating via the channel. The memory 608 can additionally store protocols and/or algorithms associated with estimating and/or utilizing a channel (e.g., performance based, capacity based, etc.) as well as operating with multiples sectors.

It will be appreciated that the data store (e.g., the memory 608) described herein can be either volatile memory or non-volatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 608 of the subject apparatus and methods is intended to comprise, without being limited to, these and any other suitable types of memory.

Figure 7:
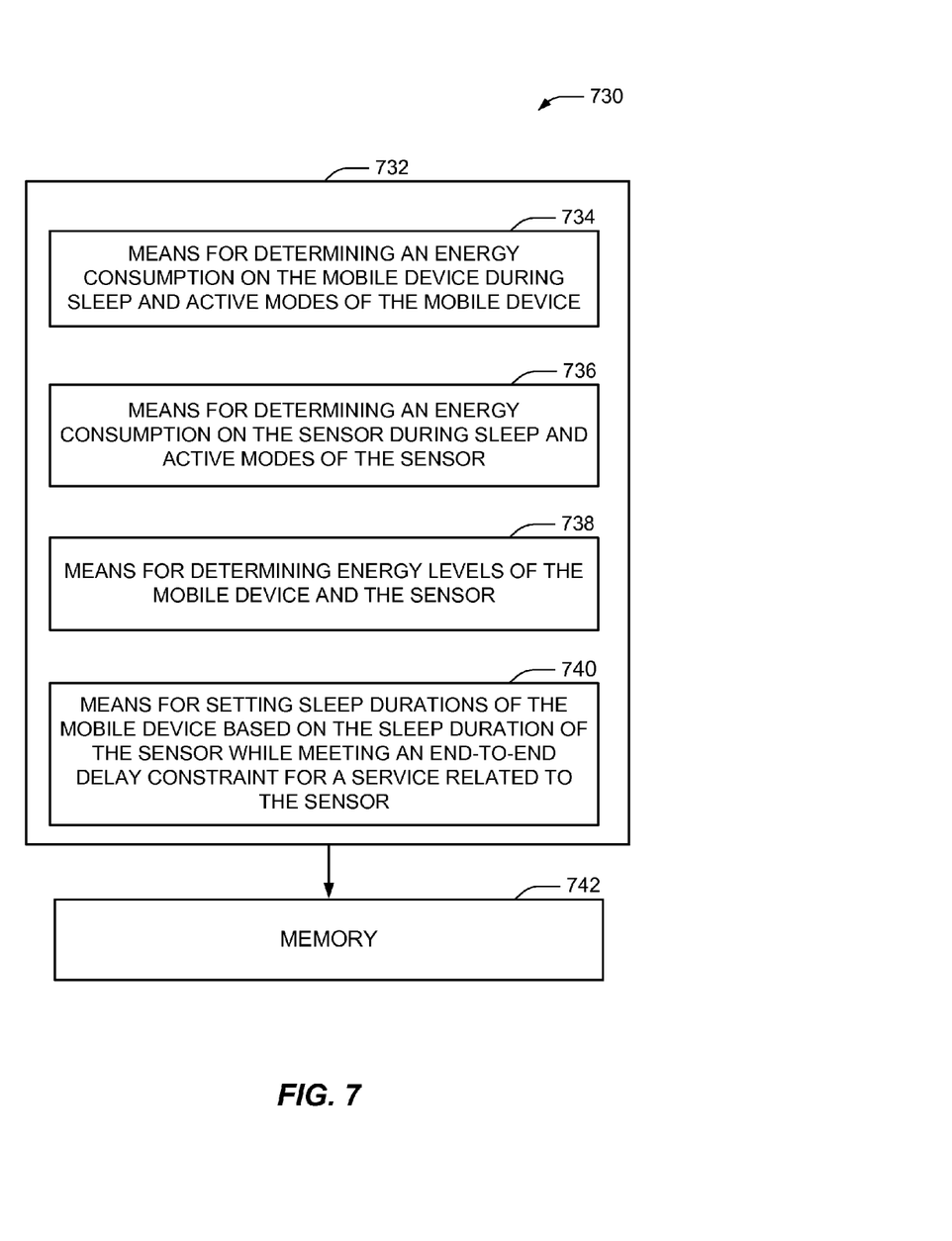
FIG. 7 is a block diagram illustrating the functionality of a wireless apparatus configured in accordance with one aspect of the disclosure.

Referring to FIG. 7, in some cases, the described aspects include a system 730 for operating a mobile device and a sensor within local wireless proximity of the mobile device. For example, the system 730 can at least partially reside within the wireless communication apparatus. It is to be appreciated that the system 730 is represented as including functional blocks, which can be functional blocks that represent functions implemented by a processor, software, or a combination thereof (e.g., firmware).

The system 730 includes a logical grouping 732 of means that can act in conjunction. For instance, the logical grouping 732 can include means for determining an energy consumption on the mobile device during sleep and active modes of the mobile device (block 734). The logical grouping 732 can also include means for determining an energy consumption on the sensor during sleep and active modes of the sensor (block 736). Further, logical grouping 732 can include means for determining energy levels of the mobile device and the sensor (block 738). Additionally, the logical grouping 792 can include means for setting sleep durations of the mobile device based on the sleep duration of the sensor while meeting an end-to-end delay constraint for a service related to the sensor (block 740).

Additionally, system 730 can include a memory 742 that retains instructions for executing functions associated with the means 734, 736, 738 and 740. While shown as being external to memory 742, it is to be understood that one or more of the means 734, 736, 738 and 740 can exist within memory 742.

Those of skill will appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The previous description is provided to enable any person skilled in the art to fully understand the full scope of the disclosure. Modifications to the various configurations disclosed herein will be readily apparent to those skilled in the art. Thus, the claims are not intended to be limited to the various aspects of the disclosure described herein, but is to be accorded the full scope consistent with the language of claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method for operating a mobile device and a sensor within local wireless proximity of the mobile device comprising:
    determining an energy consumption on the mobile device during sleep and active modes of the mobile device;
    determining an energy consumption on the sensor during sleep and active modes of the sensor;
    determining energy levels of the mobile device and the sensor;
    using a parameter to determine sleep durations of the sensor and the mobile device, wherein the parameter is not a duty cycle, and the parameter is based on a frequency of rechargeability and a maximum capacity of energy storage; and
    setting the sleep durations of the mobile device based on a sleep duration of the sensor while meeting an end-to-end delay constraint for a service related to the sensor, the end-to-end delay constraint defined between at least the sensor and a node requesting the service.

2. The method of claim 1, wherein the parameter is further based on a function of a current stored energy level.

3. The method of claim 2, wherein the function is a weighting function.

4. The method of claim 1, wherein the mobile device energy consumption determination comprises determining energy consumed for tasks associated with the sensor.

5. The method of claim 1, wherein the mobile device energy consumption determination comprises determining energy consumption for tasks other than those associated with the sensor.

6. The method of claim 1, further comprising setting active durations of the sensor and the mobile device.

7. The method of claim 1, wherein the local wireless proximity comprises a peer-to-peer proximity scheme.

8. The method of claim 1, further comprising determining switching energy costs between the sleep and active modes.

9. The method of claim 1, further comprising:
determining an energy consumption on a second sensor within the local wireless proximity of the mobile device during sleep and active modes of the second sensor;
determining an energy level of the second sensor; and
setting the sleep duration of the mobile device, the sensor and the second sensor while meeting the end-to-end delay constraint for services related to the sensor and the second sensor.

10. An apparatus for operating a mobile device and a sensor within local wireless proximity of the mobile device, comprising:
a memory configured to store a plurality of instructions; and
a processing system configured to execute the plurality of instructions to:
determine an energy consumption on the mobile device during sleep and active modes of the mobile device;
determine an energy consumption on the sensor during sleep and active modes of the sensor;
determine energy levels of the mobile device and the sensor;
use a parameter to determine sleep durations of the sensor and the mobile device, wherein the parameter is not a duty cycle, and the parameter is based on a frequency of rechargeability and a maximum capacity of energy storage; and
set sleep durations of the mobile device based on the determined sleep duration of the sensor while meeting an end-to-end delay constraint for a service related to the sensor, the end-to-end delay constraint defined between at least the sensor and a node requesting the service.

11. The apparatus of claim 10, wherein the parameter is further based on a function of a current stored energy level.

12. The apparatus of claim 11, wherein the function is a weighting function.

13. The apparatus of claim 10, wherein the processing system is further configured to determine energy consumed for tasks associated with the sensor.

14. The apparatus of claim 10, wherein the processing system is further configured to determine energy consumption for tasks other than those associated with the sensor.

15. The apparatus of claim 10, wherein the processing system is further configured to set active durations of the sensor and the mobile device.

16. The apparatus of claim 10, wherein the local wireless proximity comprises a peer-to-peer proximity scheme.

17. The apparatus of claim 10, wherein the processing system is further configured to determine switching energy costs between the sleep and active modes.

18. The apparatus of claim 10, wherein the processing system is further configured to:
determine an energy consumption on a second sensor within the local wireless proximity of the mobile device during sleep and active modes of the second sensor;
determine an energy level of the second sensor; and
set the sleep duration of the mobile device, the sensor and the second sensor while meeting the end-to-end delay constraint for services related to the sensor and the second sensor.

19. An apparatus for operating a mobile device and a sensor within local wireless proximity of the mobile device, comprising:
means for determining an energy consumption on the mobile device during sleep and active modes of the mobile device;
means for determining an energy consumption on the sensor during sleep and active modes of the sensor;
means for determining energy levels of the mobile device and the sensor;
means for using a parameter to determine sleep durations of the sensor and the mobile device, wherein the parameter is not a duty cycle, and the parameter is based on a frequency of rechargeability and a maximum capacity of energy storage; and
means for setting sleep durations of the mobile device based on the determined sleep duration of the sensor while meeting an end-to-end delay constraint for a service related to the sensor, the end-to-end delay constraint defined between at least the sensor and a node requesting the service.

20. The apparatus of claim 19, wherein the parameter is further based on a function of a current stored energy level.

21. The apparatus of claim 20, wherein the function is a weighting function.

22. The apparatus of claim 19, wherein the mobile device energy consumption determination comprises means for determining energy consumed for tasks associated with the sensor.

23. The apparatus of claim 19, wherein the mobile device energy consumption determination comprises means for determining energy consumption for tasks other than those associated with the sensor.

24. The apparatus of claim 19, further comprising means for setting active durations of the sensor and the mobile device.

25. The apparatus of claim 19, wherein the local wireless proximity comprises a peer-to-peer proximity scheme.

26. The apparatus of claim 19, further comprising means for determining switching energy costs between the sleep and active modes.

27. The apparatus of claim 19, further comprising:
means for determining an energy consumption on a second sensor within the local wireless proximity of the mobile device during sleep and active modes of the second sensor;
means for determining an energy level of the second sensor; and
means for setting the sleep duration of the mobile device, the sensor and the second sensor while meeting the end-to-end delay constraint for services related to the sensor and the second sensor.

28. A computer-program product for operating a mobile device and a sensor within local wireless proximity of the mobile device, comprising:
a non-transitory machine-readable medium comprising instructions executable to:
determine an energy consumption on the mobile device during sleep and active modes of the mobile device;
determine an energy consumption on the sensor during sleep and active modes of the sensor;
determine energy levels of the mobile device and the sensor;
use a parameter to determine sleep durations of the sensor and the mobile device, wherein the parameter is not a duty cycle, and the parameter is based on a frequency of rechargeability and a maximum capacity of energy storage; and
set sleep durations of the mobile device based on the determined sleep duration of the sensor while meeting an end-to-end delay constraint for a service related to the sensor, the end-to-end delay constraint defined between at least the sensor and a node requesting the service.

* * * * *